(12) United States Patent
Evans

(10) Patent No.: US 11,104,605 B2
(45) Date of Patent: Aug. 31, 2021

(54) PROCESS FOR MAKING MULTI-FIBER, PHYSICAL CONTACT FIBER FERRULE ASSEMBLIES

(71) Applicant: Corning Research & Development Corporation, Corning, NY (US)

(72) Inventor: Alan Frank Evans, Beaver Dams, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/697,093

(22) Filed: Nov. 26, 2019

(65) Prior Publication Data

US 2021/0155534 A1    May 27, 2021

(51) Int. Cl.
| | | |
|---|---|---|
| *C03C 15/00* | (2006.01) | |
| *C03C 23/00* | (2006.01) | |
| *G02B 6/245* | (2006.01) | |
| *G02B 6/38* | (2006.01) | |

(52) U.S. Cl.
CPC .......... *C03C 15/00* (2013.01); *C03C 23/0025* (2013.01); *G02B 6/245* (2013.01); *G02B 6/3854* (2013.01)

(58) Field of Classification Search
CPC ..... C03C 15/00; C03C 23/0025; G02B 6/245; G02B 6/3854
See application file for complete search history.

(56) References Cited

U.S. PATENT DOCUMENTS

| | | | | |
|---|---|---|---|---|
| 4,948,219 A | * | 8/1990 | Seino | ....................... G02B 6/30 385/95 |
| 8,740,474 B2 | | 6/2014 | Lu | |
| 9,823,426 B2 | | 11/2017 | Oniki et al. | |
| 2005/0254769 A1 | | 11/2005 | Qiu et al. | |
| 2019/0384024 A1 | * | 12/2019 | Neukirch | ............. G02B 6/4292 |

FOREIGN PATENT DOCUMENTS

| | | |
|---|---|---|
| CN | 1790074 A | 6/2006 |
| CN | 108873184 A | 11/2018 |

OTHER PUBLICATIONS

Iliescu et al; "A Review of Wet Etching of Glass,"; Chapter 5 of Glass Materials Research Progress, Ed. Jonas C. Wolf and Luka Lange, Nova Science Publishers, Inc.; 14 Pages; (2008) ISBN 978-1-60456-578-2.
Spierings; "Review: Wet Chemical Etching of Silicate Glasses in Hydrofluoric Acid Based Solutions"; Journal of Materials Science, 28 (1993) pp. 6261-6273.

* cited by examiner

*Primary Examiner* — Anita K Alanko
(74) *Attorney, Agent, or Firm* — Michael E. Carroll, Jr.

(57) ABSTRACT

A method of manufacturing a fiber ferrule assembly that includes inserting an exposed end portion of a plurality of optical fibers including a core and a cladding into an array of insertion holes disposed in a glass ferrule plate. The glass ferrule plate includes a glass material that differs from a glass material of both the core and the cladding. The method further includes chemically etching the glass ferrule plate and the exposed end portion of the plurality of optical fibers using a chemical etchant for an etching time period. The glass ferrule plate etches at a first etching rate, the exposed end portion etches at a second etching rate, and the first etching rate is faster than the second etching rate such that, after the etching time period, the exposed end portion of each of the plurality of optical fibers protrude from a second surface of the glass ferrule plate.

32 Claims, 12 Drawing Sheets

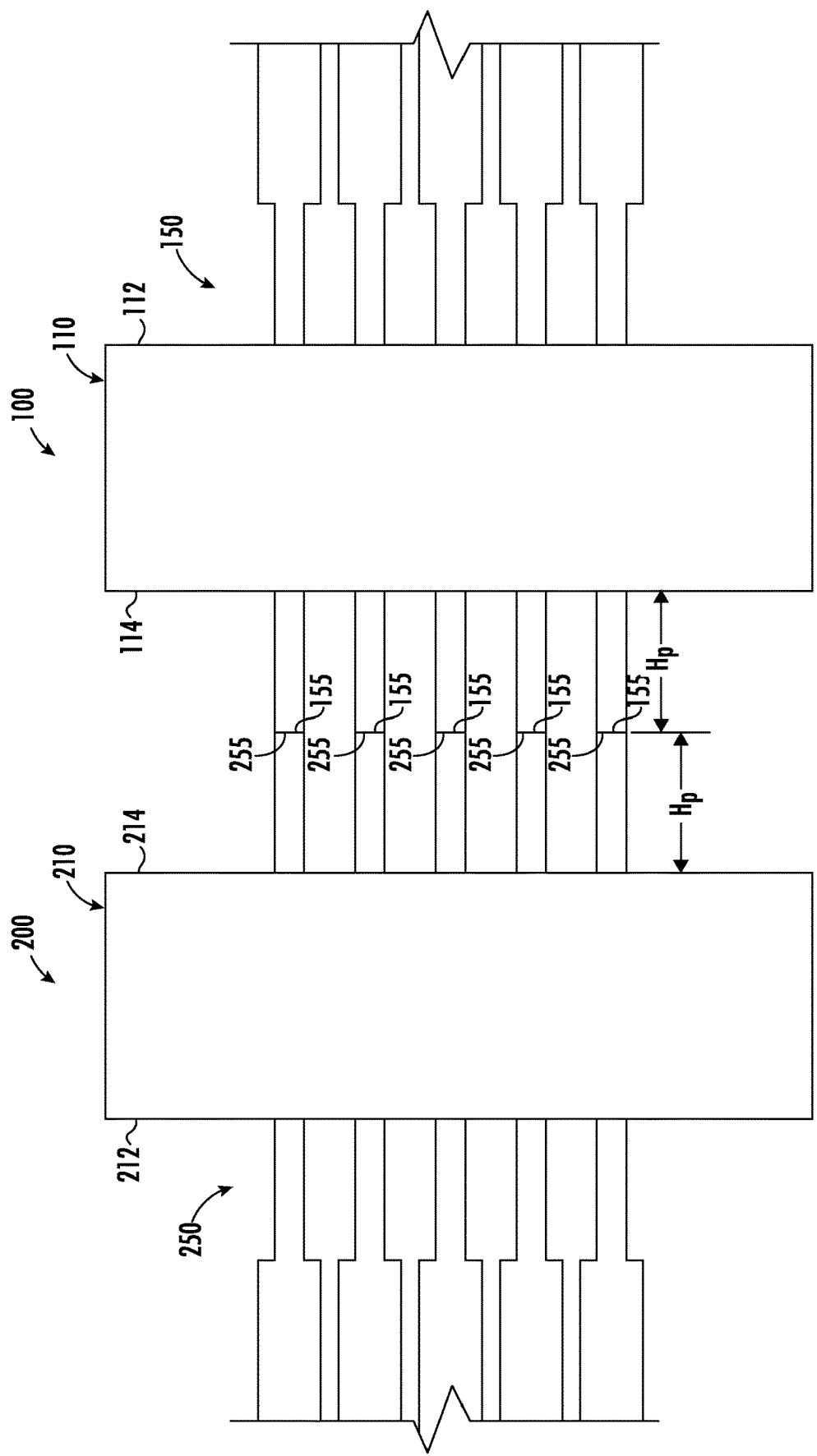

PROCESS FOR MAKING MULTI-FIBER, PHYSICAL CONTACT FIBER FERRULE ASSEMBLIES

BACKGROUND

Field

The present specification generally relates to methods of manufacturing a fiber ferrule assembly. More specifically, the present disclosure relates to methods of manufacturing a fiber ferrule assembly that include chemically etching a glass ferrule plate together with optical fibers that are coupled to the glass ferrule plate.

Technical Background

As bandwidth demand increases in intra-data center and inter-data center optical interconnects, the demand for optical transmission speed on a per fiber basis also increases. For example, computationally-intensive, cloud-based services available anywhere, any time and with low network latency are possible using hyper scale data centers using up to 100,000 compute servers with large cable trunks to optically couple these hyper-scale data centers. Currently, commercially available data center transceivers are limited to a data rate of 100 Gb/s with 400 Gb/s becoming available soon. In addition, datacenters use high fiber count cables, for example, cables having over 6500 fibers arranged in a large number 12 fiber count ribbons, which may be fusion spliced in the field. Fusion splicing in the field is performed by specialized technicians, increasing the labor costs of fiber installation and slowing deployment time. Thus, it is desired to factory instill optical fibers into high fiber-count optical connectors.

One installation approach includes extra lens elements. However, these extra lens elements increase the cost of the system, complicate the alignment of the system, and may cause Fresnel reflections, which increase optical loss and back reflection. Another installation approach uses a small gap between the ends of the fiber arrays. However, the gap also causes Fresnel reflections at each fiber interface. While an anti-reflective coating may be use to mitigate Fresnel reflections, these coatings are applied after the fibers are assembled into a ferrule, making anti-reflective coating applications difficult to achieve in high volume. Furthermore, the presence of a gap increases the likelihood of dust or debris getting into the gap, contaminating the core region of the fiber end face and adding optical loss. Yet another installation approach includes physically mating all fibers in the array to the adjacent array. Physical contact reduces Fresnel reflections and avoids contamination when installed and may minimize optical loss. However, when the end facets of the fibers do not have co-planarity, it is difficult to achieve the sub-micron precision needed for single mode alignment without increasing the mating force to account for this non-co-planarity. In addition, non-co-planarity also increases optical loss.

Accordingly, there is a desire for improved methods of manufacturing a fiber ferrule assembly with a high fiber count to maximize flatness and minimize deformations at the end faces of the optical fibers and reduce optical loss to help address the high bandwidth demand in inter and intra-datacenter optical interconnects with low optical loss and minimal back reflection at a low cost.

SUMMARY

According to an embodiment of the present disclosure, a method of manufacturing a fiber ferrule assembly includes inserting an exposed end portion of a plurality of optical fibers from a first surface of a glass ferrule plate into an array of insertion holes disposed in the glass ferrule plate. The exposed end portion of the plurality of optical fibers includes a core and a cladding surrounding the core. The glass ferrule plate includes a glass material that differs from a glass material of both the core and the cladding. The method further includes chemically etching the glass ferrule plate and the exposed end portion of the plurality of optical fibers using a chemical etchant for an etching time period. The glass ferrule plate is etched at a first etching rate. The exposed end portion is etched at a second etching rate. In addition, the first etching rate is faster than the second etching rate such that, after the etching time period, the exposed end portion of each of the plurality of optical fibers protrude from a second surface of the glass ferrule plate opposite the first surface.

According to another embodiment of the present disclosure, a method of optically coupling a first plurality of optical fibers and a second plurality of optical fibers includes inserting an exposed end portion of the first plurality of optical fibers from a first surface of a first glass ferrule plate into an array of insertion holes disposed in the first glass ferrule plate and chemically etching the first glass ferrule plate and the exposed end portion of the first plurality of optical fibers using a chemical etchant for an etching time period. The glass ferrule plate is etched at a faster etching rate than the exposed end portion of the first plurality of optical fibers such that, after the etching time period, the exposed end portion of each of the first plurality of optical fibers protrude from a second surface of the first glass ferrule plate opposite the first surface and terminate at an end facet. The method also includes inserting an exposed end portion of the second plurality of optical fibers from a first surface of a second glass ferrule plate into an array of insertion holes disposed in the second glass ferrule plate and chemically etching the second glass ferrule plate and the exposed end portion of the second plurality of optical fibers using a chemical etchant for an etching time period. The second glass ferrule plate is etched at a faster etching rate than the exposed end portion of the second plurality of optical fibers such that, after the etching time period, the exposed end portion of each of the second plurality of optical fibers protrude from a second surface of the second glass ferrule plate opposite the first surface and terminate at an end facet. The method further includes placing the end facets of the first and second plurality of optical fibers in direct contact thereby optically coupling the first and second plurality of optical fibers.

According to yet another embodiment of the present disclosure, a method of manufacturing a fiber ferrule assembly includes inserting an exposed end portion of a plurality of optical fibers from a first surface of a glass ferrule plate into an array of insertion holes disposed in the glass ferrule plate. The exposed end portion of the plurality of optical fibers includes a core and a cladding surrounding the core. The method also includes laser forming a damage plane in the glass ferrule plate at a removal depth $D_R$ from the second surface using a laser beam and chemically etching the glass ferrule plate and the exposed end portion of the plurality of optical fibers using a chemical etchant for an etching time period. The damage plane of the glass ferrule plate is etched at a first etching rate. The exposed end portion is etched at a second etching rate. In addition, the first etching rate is faster than the second etching rate such that, after the etching time period, the exposed end portion of each of the plurality of optical fibers protrude from a second surface of the glass ferrule plate opposite the first surface.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2 schematically depicts a side view of a pair of fiber ferrule assemblies each having a plurality of optical fibers that are optically coupled to one another, according to one or more embodiments shown and described herein;

DETAILED DESCRIPTION

Figure 1A:
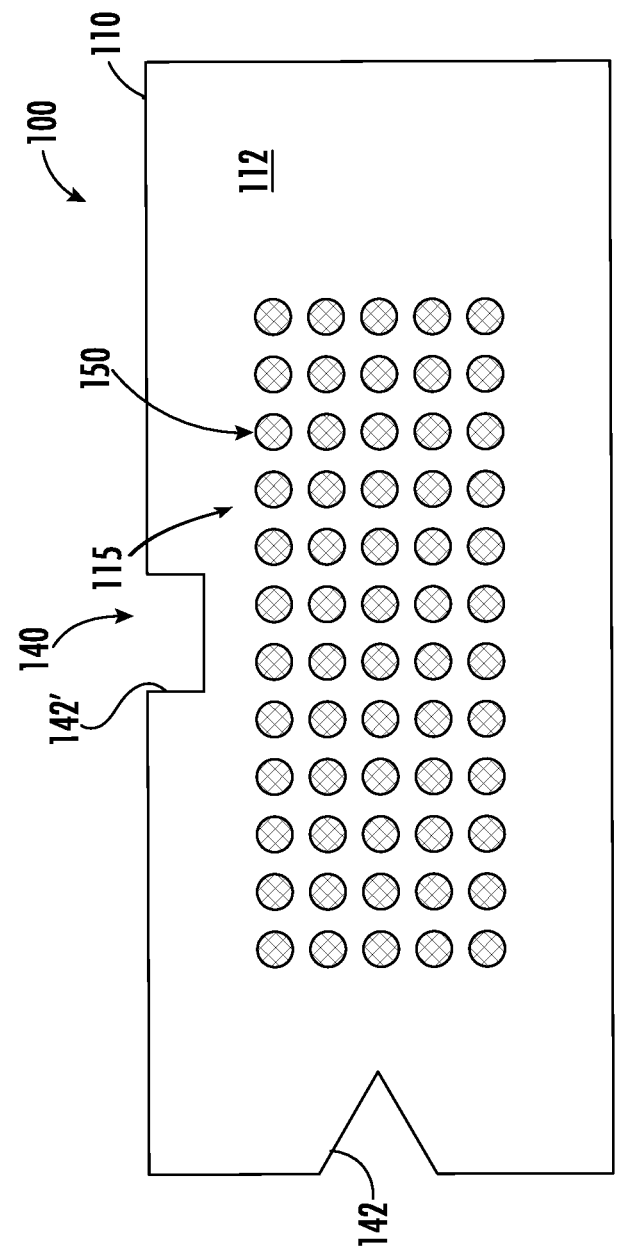
FIG. 1A schematically depicts a front view of a fiber ferrule assembly having a plurality of optical fibers disposed in an array of insertion holes of a glass ferrule plate that includes alignment notches, according to one or more embodiments shown and described herein.

Reference will now be made in detail to methods of manufacturing a fiber ferrule assembly and optically coupling the optical fibers of a pair of fiber ferrule assemblies, examples of which are illustrated in the accompanying drawings. The fiber ferrule assembly includes a glass ferrule plate having an array of insertion holes and a plurality of optical fibers each having an exposed end portion that comprises a core and a cladding surrounding the core. The insertion holes extend from a first end to a second end of the glass ferrule plate and the exposed end portion of each of the plurality of optical fibers protrude from the second surface of the glass ferrule plate. The methods described herein achieve uniform co-planarity between the end facets of the plurality of optical fibers. Uniform co-planarity facilitates direct contact optical coupling between a pair of fiber ferrule assemblies at a low mating force, the optical connection having low insertion losses and low back-reflection.

During the manufacturing of the fiber ferrule assembly, each exposed end portion of the plurality of optical fibers may be inserted into an individual insertion hole of the array of insertion holes and fixedly coupled therein. Next, the second surface of the glass ferrule plate and the exposed end portions may be chemically etched. In particular, the glass ferrule plate and the exposed end portion of the plurality of optical fibers may comprise different glass materials that chemically etch at different etching rates when exposed to the same etching conditions. The differential chemical etching causes the exposed end portions of each of the plurality of optical fibers to protrude uniformly from the second surface and forms end facets that are co-planar. Embodiments of a fiber ferrule assembly and methods of manufacturing the fiber ferrule assembly will now be described and, whenever possible, the same reference numerals will be used throughout the drawings to refer to the same or like parts.

Figure 1B:
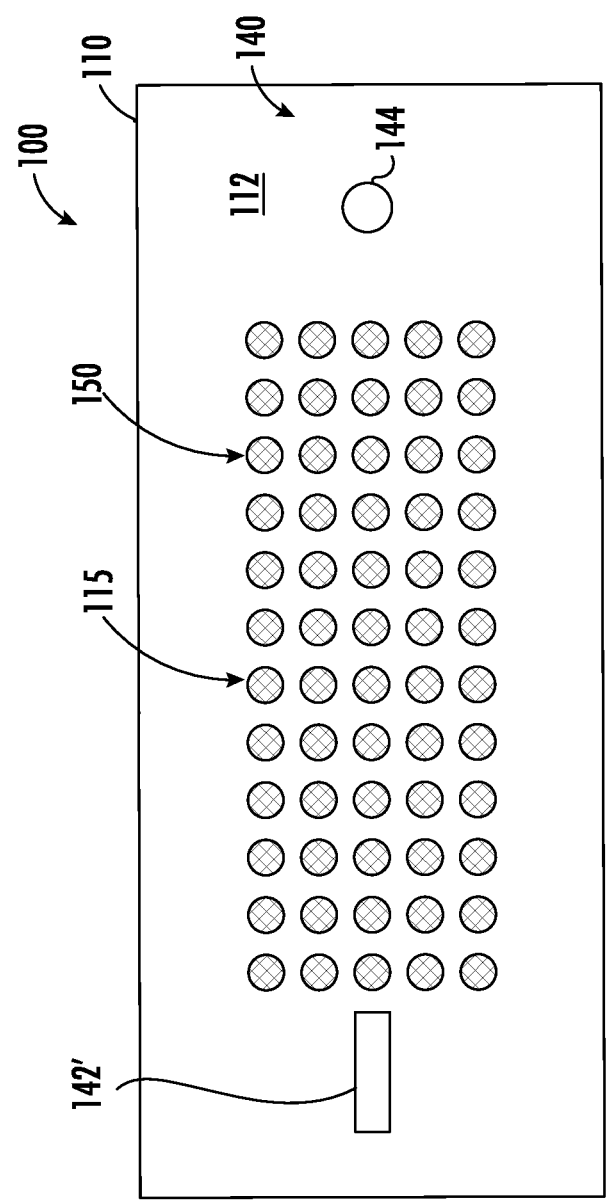
FIG. 1B schematically depicts a front view of a fiber ferrule assembly having a plurality of optical fibers disposed in an array of insertion holes of a glass ferrule plate that includes alignment holes, according to one or more embodiments shown and described herein.

Referring now to FIGS. 1A-1D, a fiber ferrule assembly 100 is schematically depicted. The fiber ferrule assembly 100 comprises a glass ferrule plate 110 comprising an array of insertion holes 115 disposed in the glass ferrule plate 110 and a plurality of optical fibers 150 each coupled to an individual one of the array of insertion holes 115. FIGS. 1A and 1B each show a front view of the fiber ferrule assembly 100 having different arrangements of alignment features 140 and FIGS. 1C and 1D each show a side view of the fiber ferrule assembly 100 with different sized insertion holes 115. The plurality of optical fibers 150 are fixedly coupled to the array of insertion holes 115, for example, using an epoxy 160 (FIG. 3B), a friction fit, or other attachment mechanism. While FIGS. 1A and 1B depict 60 insertion holes 115 and 60 optical fibers 150 positioned therein, it should be understood that the array of insertion holes 115 may comprise any number of insertion holes 115 sized and arranged to accommodate a wide variety of optical fiber ribbons and arrangements. For example, some current commercially available fiber ribbons include 12 fibers and thus it may be advantageous for the array of insertion holes 115 to include 12 insertion holes.

The one or more alignment features 140 facilitate positional alignment between pairs of fiber ferrules assemblies 100 to optically couple the optical fibers 150 of these fiber ferrule assemblies 100. As used herein, "optically coupled" refers to two or more optical components arranged such that photons may be transferred therebetween. In some embodiments, as shown in FIG. 1A, the one or more alignment features 140 include one or more alignment notches 142, 142' extending into the perimeter of the glass ferrule plate 110. The alignment notches 142, 142' may include angular, "v-shaped" notches, such as shown by alignment notch 142, and may include square notches, such as shown by alignment notch 142', which include a flat bottom that can operate as a datum and provide rotational alignment when aligning multiple fiber ferrule assemblies. In some embodiments, as shown in FIG. 1B, the one or more alignment features 140 include one or more alignment holes 144, 144' extending from the first surface 112 to the second surface 114. The alignment holes 144, 144' may include circular or round holes, such as shown by alignment hole 144, and may include rectilinear slots, such as shown by alignment hole 144'. However, any suitable shape is possible for the alignment holes such as slots that are rectangular-like with round ends. Circular or round alignment holes 144 may comprise a diameter of from 500 µm to 2 mm, for example 700 µm. It should be understood that one or more alignment features 140 may include any combination of alignment notches 142, 142' and alignment holes 144, 144'. In operation, the one or more alignment features 140 may be used to receive alignment pins to align pairs of fiber ferrule assemblies. Furthermore, the one or more alignment features 140 may be used with an adaptor housing, configured to surround the glass ferrule plate 110. The adaptor housing may comprise one or more protrusions, which extend into the alignment features 140 when surrounding the glass ferrule plate 110. Indeed, the one or more alignment features 140 and the associated pins, protrusions, or the like, constrain the movement of a pair of fiber ferrule assemblies without adding additional force requirements when placing two pluralities of optical fibers in contact.

Figure 1C:
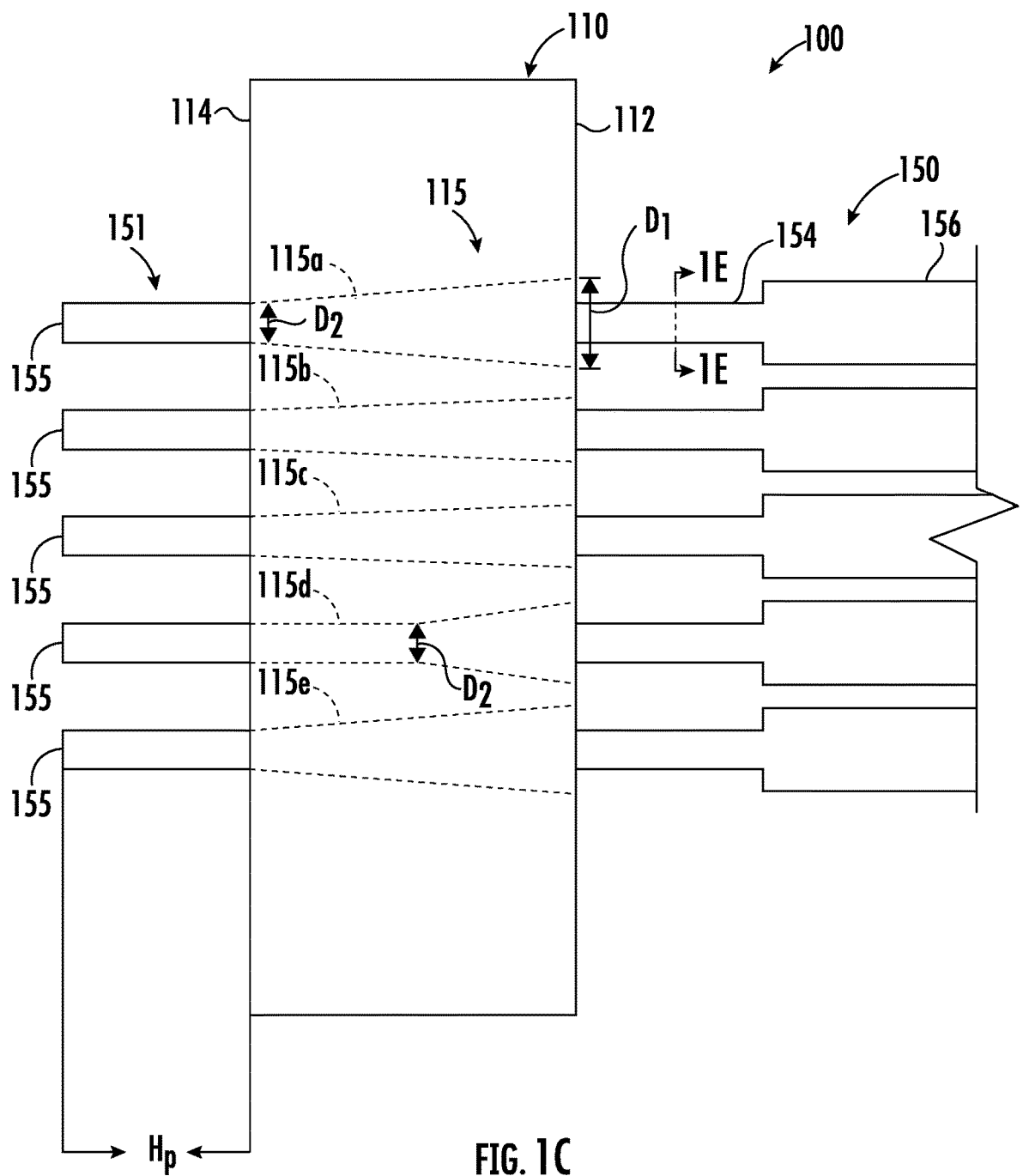
FIG. 1C schematically depicts a side view of a fiber ferrule assembly having tapered insertion holes, according to one or more embodiments shown and described herein.
Figure 1D:
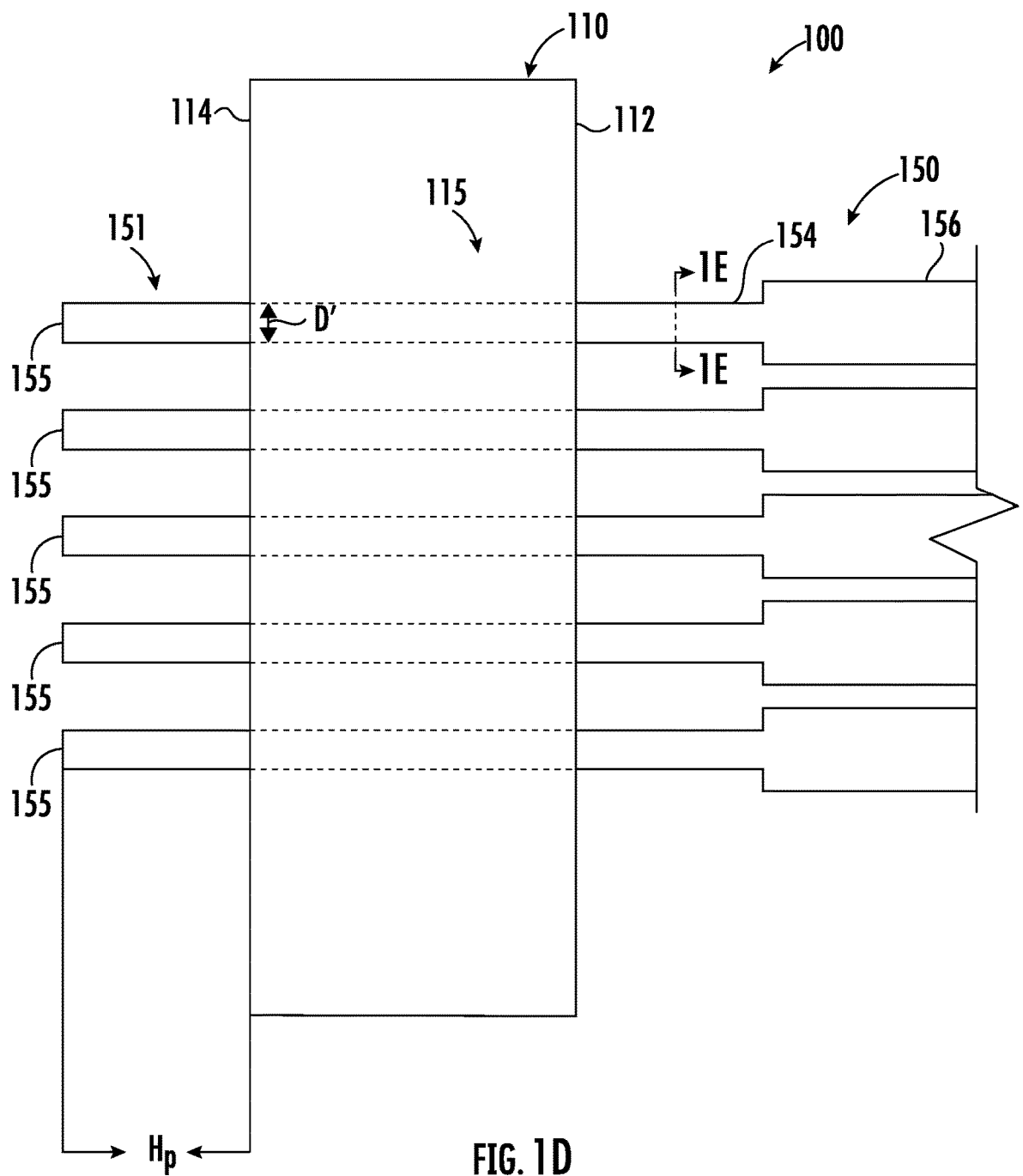
FIG. 1D schematically depicts a side view of a fiber ferrule assembly having straight insertion holes, according to one or more embodiments shown and described herein.

Referring now to FIGS. 1C and 1D, each of the plurality of optical fibers 150 protrude from the second surface 114 of the glass ferrule plate 110. In particular, an exposed end portion 151 of each of the plurality of optical fibers 150 extend a protrusion height $H_P$ from the second surface 114 of the glass ferrule plate 110. In some embodiments, the protrusion height $H_P$ is from 500 nm to 5000 nm, such as from 1000 nm to 3500 nm, or from 1500 nm to 3000 nm, for example, 750 nm, 1000 nm, 1250 nm, 1500 nm, 1750 nm, 2000 nm, 2250 nm, 2500 nm, 2750 nm, 3000 nm, 3250 nm, 3500 nm, 3750 nm, 4000 nm, 4500 nm, or the like. In addition, the protrusion height $H_P$ of each of the plurality of optical fibers 150 differs by 500 nm or less, such as 450 nm, 400 nm, 350 nm, 300 nm, 250 nm, 200 nm, 150 nm, 100 nm, 50 nm, 25 nm, or less. Indeed, in some embodiments, the protrusion height $H_P$ of each of the plurality of optical fibers 150 is equal. Moreover, adjacent pairs of optical fibers of the plurality of optical fibers 150 may have increased height similarity. For example, the protrusion height $H_P$ of each pair of adjacent exposed end portions 151 differs by 300 nm or less, such as 250 nm, 200 nm, 150 nm, 100 nm, 50 nm, 25 nm, or less. Minimizing the variability of the protrusion height $H_P$ of the plurality of optical fibers 150 increases the co-planarity and uniformity of the end facets 155 of the plurality of optical fibers 150 thereby facilitating low mating force direct contact optical coupling with a second fiber ferrule assembly 200, for example, as depicted in FIG. 2.

Figure 1E:
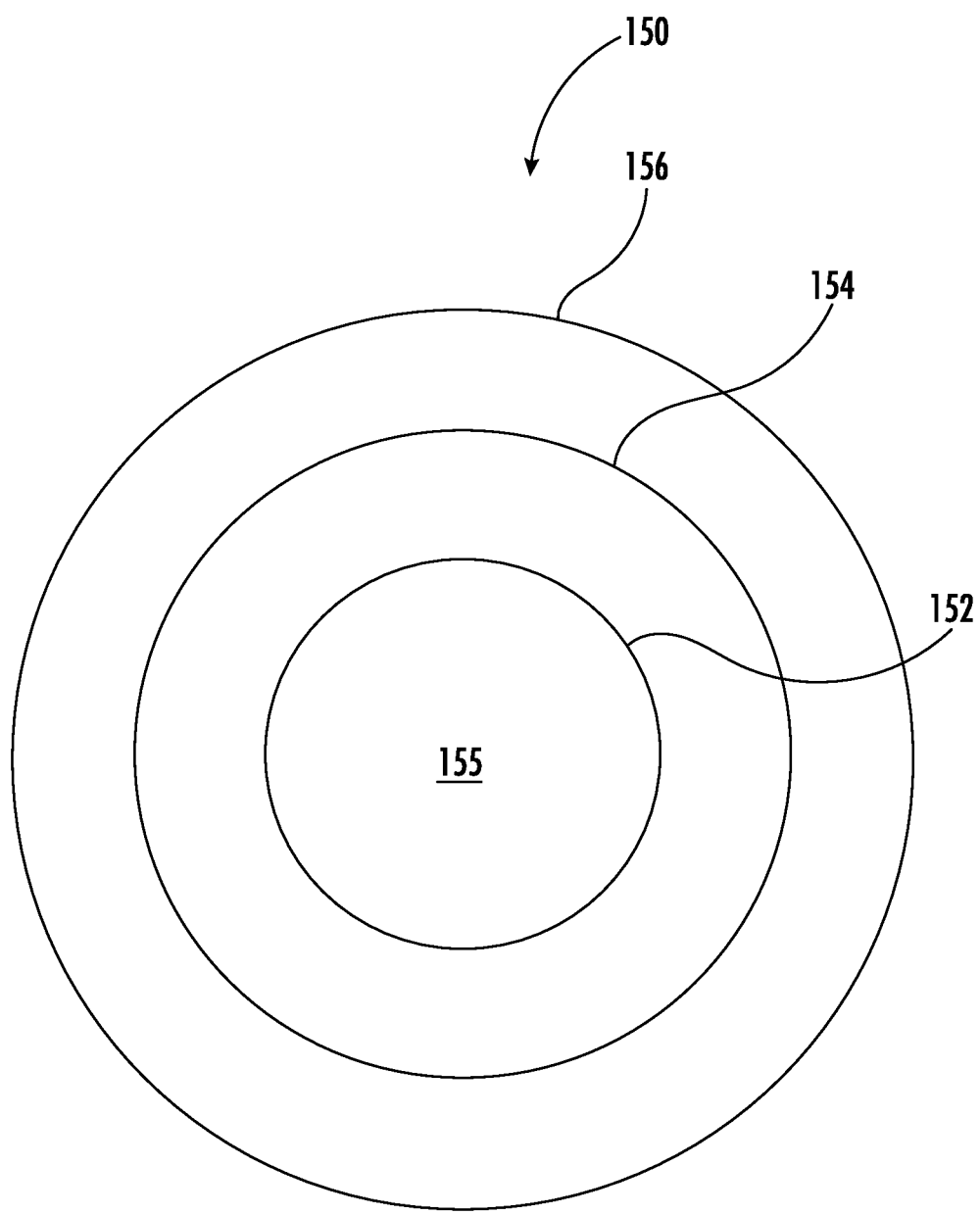
FIG. 1E schematically depicts a cross section of an individual optical fiber of FIGS. 1C and 1D taken along line 1E-1E of FIGS. 1C and 1D, according to one or more embodiments shown and described herein.

Referring now to FIG. 1E, a cross section of an individual optical fiber of the plurality of optical fibers 150 of FIGS. 1C and 1D taken along line 1C-1C of FIGS. 1B and 1C is shown. As depicted in FIG. 1E, each optical fiber 150 comprises a core 152 and a cladding 154 surrounding the core 152 and each optical fiber 150 terminates at an end facet 155. The core 152 and the cladding 154 each comprises a first glass material and the core 152 comprises a higher refractive index than the cladding 154. Each optical fiber 150 may also comprise a one or more coating layers 156 surrounding the cladding 154. The coating layers 156 may comprise a polymer material, such as acrylate, epoxy, or the like. In some embodiments, the plurality of optical fibers 150 comprise single mode optical fibers.

Referring again to FIGS. 1C and 1D, the array of insertion holes 115 extend from a first surface 112 of the glass ferrule plate 110 to a second surface 114 of the glass ferrule plate 110, opposite the first surface 112. In some embodiments, as shown in FIG. 1C, the array of insertion holes 115 are tapered and in other embodiments, as shown in FIG. 1D, the array of insertion holes 115 are straight. For example, in the tapered embodiment depicted in FIG. 1C, each of the array of insertion holes 115 comprises a first maximum cross sectional dimension $D_1$ (e.g., a first diameter) at the first surface 112 and a second maximum cross section $D_2$ (e.g., a second diameter) at the second surface 114, where the first maximum cross sectional dimension $D_1$ is larger than the second maximum cross section $D_2$. In some embodiments, the first maximum cross sectional dimension $D_1$ and the second maximum cross section $D_2$ of the plurality of insertion holes 115 may be from 20 µm to 250 µm, such as from 80 µm to 250 µm, from 126 µm to 200 µm, or the like. Further, in embodiments in which the array of insertion holes 115 comprise a larger first maximum cross sectional dimension $D_1$ than second maximum cross section $D_2$, the first maximum cross sectional dimension $D_1$ is 10% to 25% larger than the second maximum cross section $D_2$.

In embodiments in which the array of insertion holes 115 comprise a larger first maximum cross sectional dimension $D_1$ than second maximum cross sectional dimension $D_2$, the insertion holes 115 comprise a funnel shape that tapers from the first surface 112 to the second surface 114 (as shown by insertion holes 115a, 115b, 115c, and 115e) or tapers to the second maximum cross section $D_2$ at an intermediate point within the glass ferrule plate 110 and from that intermediate point to the second surface 114 remains at the constant second maximum cross section $D_2$ (as shown by insertion hole 115d). When the array of the insertion holes 115 are tapered from the first surface 112, the plurality of optical fibers 150 may be more easily inserted into the first surface 112 during assembly, while having minimal movement near the second surface 114. Furthermore, in the embodiment shown in FIG. 1D, each of the array of insertion holes 115 comprise an equal cross sectional dimension D' at both the first surface 112 and the second surface 114. In this embodiment, the cross sectional dimension D' of the plurality of insertion holes 115 may be from 20 µm to 250 µm, such as from 80 µm to 250 µm, from 126 µm to 200 µm, or the like. Moreover, while FIGS. 1C and 1D depict the tapered and straight versions of the array of insertion holes 115 separately, it should be understood that one portion of the plurality of insertions holes 115 may comprise uniform cross sectional dimensions and another portion of the plurality of insertion holes 115 of the same fiber ferrule assembly 100 may comprise tapered cross sectional dimensions.

Referring still to FIGS. 1C and 1D, in some embodiments, the glass ferrule plate 110 comprises a glass material that differs from a glass material of both the core 152 and the cladding 154. For example, the core 152 and the cladding 154 of the plurality of optical fibers 150 may comprise silica glass and the glass ferrule plate 110 may comprise a borosilicate glass, such as Corning® Pyrex® glass, or an alkali-aluminosilicate glass, such as Corning® Gorilla® glass. In some embodiments, the glass ferrule plate 110 may be strengthened, for example, by ion-exchange, before or after the array of insertion holes 115 are formed in the glass ferrule plate 110. If the glass ferrule plate 110 is strengthened after forming the array of insertion holes 115, the interior surface of the insertion holes 115 will be under compressive stress and thus less likely to break than insertion holes 115 formed after the strengthening process.

Referring now to FIG. 2, the fiber ferrule assembly 100 of FIGS. 1A-1C is depicted optically coupled to a second fiber ferrule assembly 200. Similar to the fiber ferrule assembly 100, the second fiber ferrule assembly 200 comprises a glass ferrule plate 210 having a first surface 212 opposite a second surface 214 and a plurality of optical fibers 250 coupled to the glass ferrule plate 210. The plurality of optical fibers 250 extend outward from the second surface 214 and terminate a plurality of end facets 255, where the end facets 255 protrude from the second surface by the protrusion height $H_P$. In addition, as shown in the FIG. 2, the plurality of optical fibers 150 of the fiber ferrule assembly 100 are optically coupled to the plurality of optical fibers 250 of the second fiber ferrule assembly 200. In particular, the end facets 155 of the plurality of optical fibers 150 are aligned with and in direct contact with the end facets 255 of the plurality of optical fibers 250. In some embodiments, similar to the plurality of optical fibers 150, the second plurality of optical fibers comprise single mode optical fibers.

Referring also to FIG. 3A-3D, a method of manufacturing and assembling the fiber ferrule assembly 100 will now be described. The method achieves co-planarity between the end facets 155 of the plurality of optical fibers 150 of the fiber ferrule assembly 100, which facilitates low insertion loss and low back-reflection when optically coupled to the plurality of optical fibers of another fiber ferrule assembly manufactured using the same method (such as the plurality of optical fibers 250 of the second fiber ferrule assembly 200 of FIG. 2). In addition, the co-planarity allows the plurality of optical fibers 150, 250 of the first and second fiber ferrule assemblies 100, 200 to be optically coupled by direct physical contact at a low mating force.

Figure 3A:
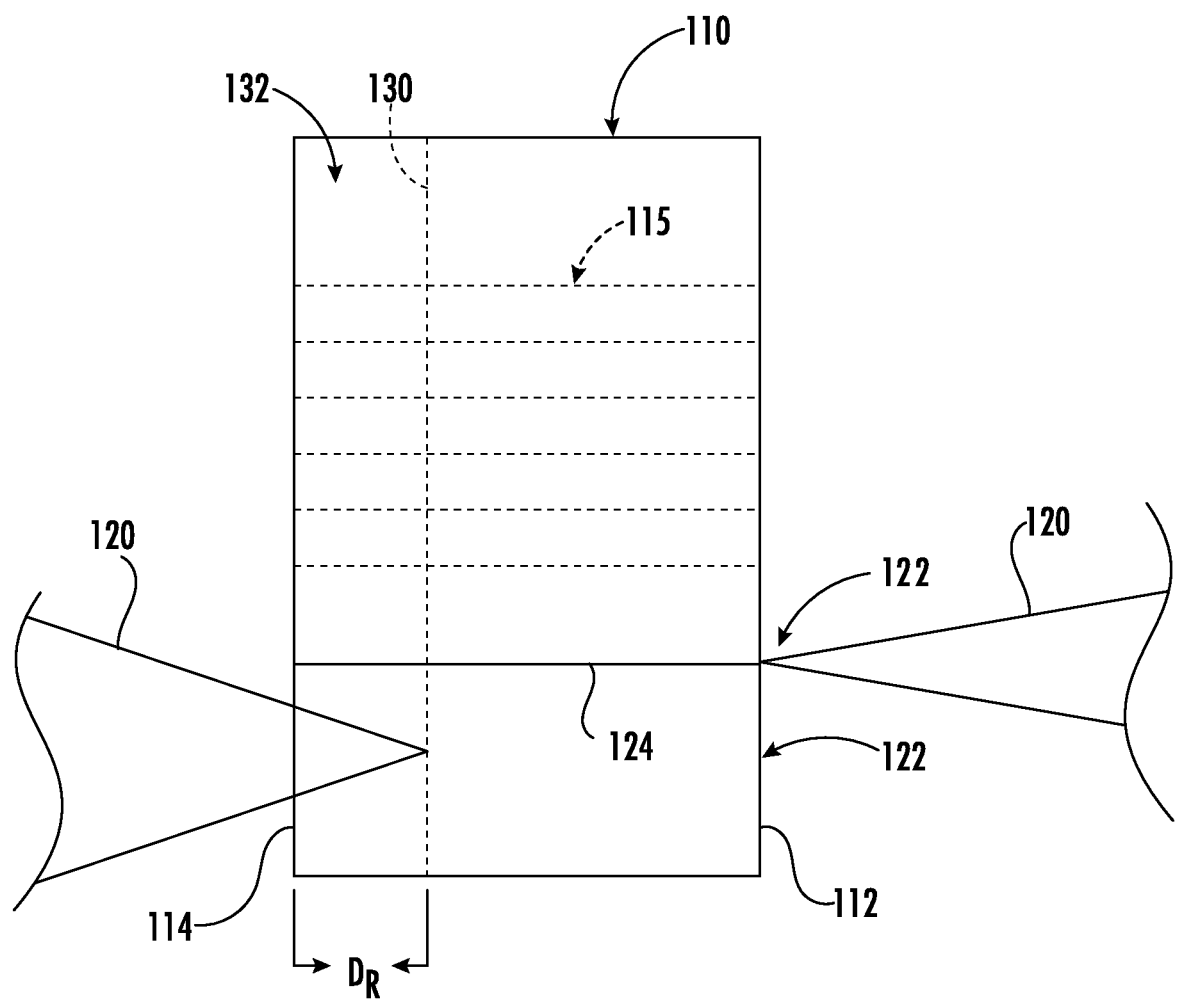
FIG. 3A schematically depicts a side view of a glass ferrule plate undergoing laser processing to form an array of insertion holes through the glass ferrule plate, according to one or more embodiments shown and described herein.

Referring now to FIG. 3A, the method first comprises preparing the plurality of optical fibers 150 and the glass ferrule plate 110 for assembly. Preparing the plurality of optical fibers 150 for assembly comprises removing (e.g., stripping) one or more coating layers 156 from an end portion of the plurality of optical fibers to expose the exposed end portion 151 of each of the plurality of optical fibers 150, as shown in FIG. 1B. The one or more coating layers 156 may be stripped from the end portions of the plurality of optical fibers 150 individually or in fiber ribbons, which facilitates faster, parallel processing. Stripping the one or more coating layers 156 may be done mechanically, thermally or chemically. Once the one or more coating layers 156 are stripped, the exposed end portion 151 may be cleaned, for example, using an alcohol wipe. Preparing the plurality of optical fibers 150 may also comprise cleaving the end of the exposed end portion 151 to increase to co-planarity of the end facets 155 of the plurality of optical fibers 150. Cleaving may be a mechanical process, for example, using a diamond blade, or may be a laser process.

Referring still to FIG. 3A, preparing the glass ferrule plate 110 also comprises forming the array of insertion holes 115 in the glass ferrule plate 110. In some embodiments, forming the array of insertion holes 115 comprises directing a laser beam 120 onto a plurality of impingement locations 122 to form a single damage track or hole 124 at the center of each impingement location 122. The laser beam 120 may comprise a single pulse laser or a pulse burst laser. The plurality of impingement locations 122, where the laser beam 120 is focused to its tightest beam width may be located on the first surface 112 (as shown in FIG. 3A), the second surface 114 of the glass ferrule plate 110, or at a point in between the first surface 112 and second surface 114 and corresponds with the locations of the array of insertion holes 115 that are formed using the laser beam 120. In some embodiments, the laser beam 120 ablates material of the glass ferrule plate 110 at the plurality of impingement locations 122 to form the plurality of continuous small damage holes 124. In other embodiments, the laser beam 120 creates a damage track 124 and surrounding glass that is more susceptible to the subsequent chemical etching process than glass not exposed to the laser. The array of insertion holes 115 may be formed from the plurality of damage tracks or holes 124 by exposing the plurality of damage tracks 124 to a chemical etchant. This removes material from the glass ferrule plate 110 along the depth the plurality of damage tracks 124, expanding each the damage track 124 into an insertion hole 115. The chemical etchant used to expand the damage tracks 124 into the array of insertion holes 115 may comprise hydrofluoric acid, hydrochloric acid, sulfuric acid, KOH, or the like.

In some embodiments, instead of expanding a single damage track 124 into an insertion hole 115, laser forming the array of insertion holes 115 may be done using a trepanning process in which the laser beam 120 is scanned along the first surface 112 or the second surface 114 of the glass ferrule plate 110 along a path corresponding with the desired perimeter of an individual insertion hole 115, thereby forming a laser exposed cylinder around the circumference of the hole. In the case of ablation, the glass material is fully removed and the cylinder falls out after the full thickness of the glass is exposed. In the case of damaging the glass, subsequent chemical treatment preferential chemically etches the glass along the cylinder wall caused the cylinder to fall out to create the insertion hole 115. While the trepanning process is slower than the single damage track process, it can be more precise, create larger holes more easily, and allows for the formation of arbitrary hole shapes in three dimensions arbitrary hole perimeters, tapered holes, or the like).

While FIG. 3A depicts a laser forming the array of insertion holes 115, it should be understood that other methods are contemplated. For example, forming the array of insertion holes 115 may comprise mechanically drilling the glass ferrule plate 110, physically etching the glass ferrule plate 110, for example, by using an ion beam source, or by using photosensitive glass. Furthermore, preparing the glass ferrule plate 110 may also include forming the one or more alignment features 140 in the glass ferrule plate 110, for example, the one or more alignment notches 142 and/or the one or more alignment holes 144. The one or more alignment features 140 may be formed using the same process that is used to form the array of insertion holes 115, for example, a laser forming process, a mechanical forming process, or a combination thereof.

Referring still to FIG. 3A, in some embodiments, the method also includes laser forming a damage plane 130 in the glass ferrule plate 110 at a removal depth $D_R$ from the second surface 114. For example, laser forming the damage plane 130 comprises directing the laser beam 120 (or a separate laser) onto the second surface 114 and scanning the laser beam 120 in subsequent passes along the second surface 114 of the glass ferrule plate 110. In particular, the laser beam 120 may be focused into the glass ferrule plate 110 at the removal depth $D_R$ and scanned along the removal depth $D_R$ to form the damage plane 130. In some embodiments, the same laser intensity may be used to form the damage plane 130 that is used to form the damage tracks 124 or damage cylinders.

Moreover, while some embodiments comprise merely forming laser damage along the laser damage plane 130 at the removal depth $D_R$, other embodiments comprising laser damaging glass material from the second surface 114 to the damage plane 130, thereby forming the laser damaged layer 132. For example, the laser beam 120 may be scanned in subsequent laser passes while focused at different depths between the second surface 114 and the removal depth $D_R$ to form the laser damaged layer 132. When forming the damage plane 130 and/or the laser damaged layer 132, it is useful to broaden the laser exposure (e.g., by defocusing the laser beam 120 at the second surface 114, thereby increasing the beam spot of the laser beam 120), which allows for more rapid laser sweep of the entire face surface. Broadening the laser exposure reduces the laser intensity, but this can be mitigated by increasing the laser power.

Without intending to be limited by theory, damaging the glass material at the laser damage plane 130 causes the glass material at the laser damage plane 130 to be more susceptible to chemical etchants. This facilitates separation of the glass ferrule plate 110 along the damage plane 130 during the subsequent etching step (FIG. 3D) to release a controlled thickness of glass material. Indeed, the removal depth $D_R$ of the damage plane 130 is similar to the protrusion height $H_P$ of the exposed end portion 151 in the fully manufactured fiber ferrule assembly 100 (FIG. 1B), such that separation of the glass ferrule plate 110 along the damage plane 130 causes the exposed end portions 151 of the plurality of optical fibers 150 to extend the protrusion height $H_P$ from the glass ferrule plate 110. Moreover, damaging the glass material throughout the laser damaged layer 132 causes the whole laser damaged layer 132 to be more susceptible to chemical etchants such that the laser damaged layer 132 chemically etches at a faster etching rate than the remaining portion of the glass ferrule plate 110 (i.e., the portion of the glass ferrule plate 110 from the damage plane 130 to the first surface 112), decreasing the etching time period required remove material of the glass ferrule plate 110 to the removal depth $D_R$. This reduces the amount of material removed from the exposed end portions 151 of the plurality of optical fibers 150 during the subsequent etching, step (FIG. 3D).

Figure 3B:
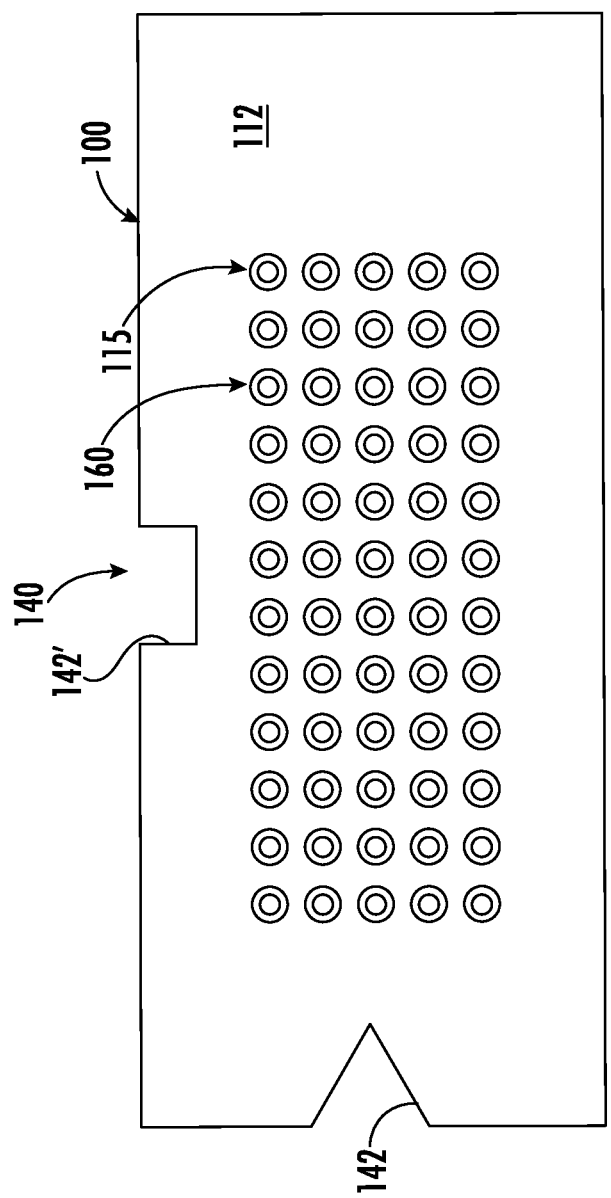
FIG. 3B schematically depicts a front view of the glass ferrule plate of FIG. 3A after laser processing, according to one or more embodiments shown and described herein.

Referring now to FIG. 3B, the method may next comprise disposing the epoxy 160 in the array of insertion holes 115, for example, directly into the array of insertion holes 115 or by disposing the epoxy 160 first on the exposed end portion 151 of each of the plurality of optical fibers 150 and then inserting the exposed end portions 151 of the plurality of optical fibers 150 into the array of insertion holes 115. Moreover, in embodiments that comprise forming the damage plane 130 and/or the laser damaged layer 132, the epoxy 160 is applied to the insertion holes 115 and the plurality of optical fibers 150 at the first surface 112 of the glass ferrule plate 110 after insertion of the exposed end portions 151 into the insertion holes 115. Thus, the epoxy 160 does not reach the damage plane 130. This prevents the epoxy 160 from hindering release of the damage plane 130 and/or the laser damaged layer 132 during the subsequent etching step (FIG. 3D).

Figure 3C:
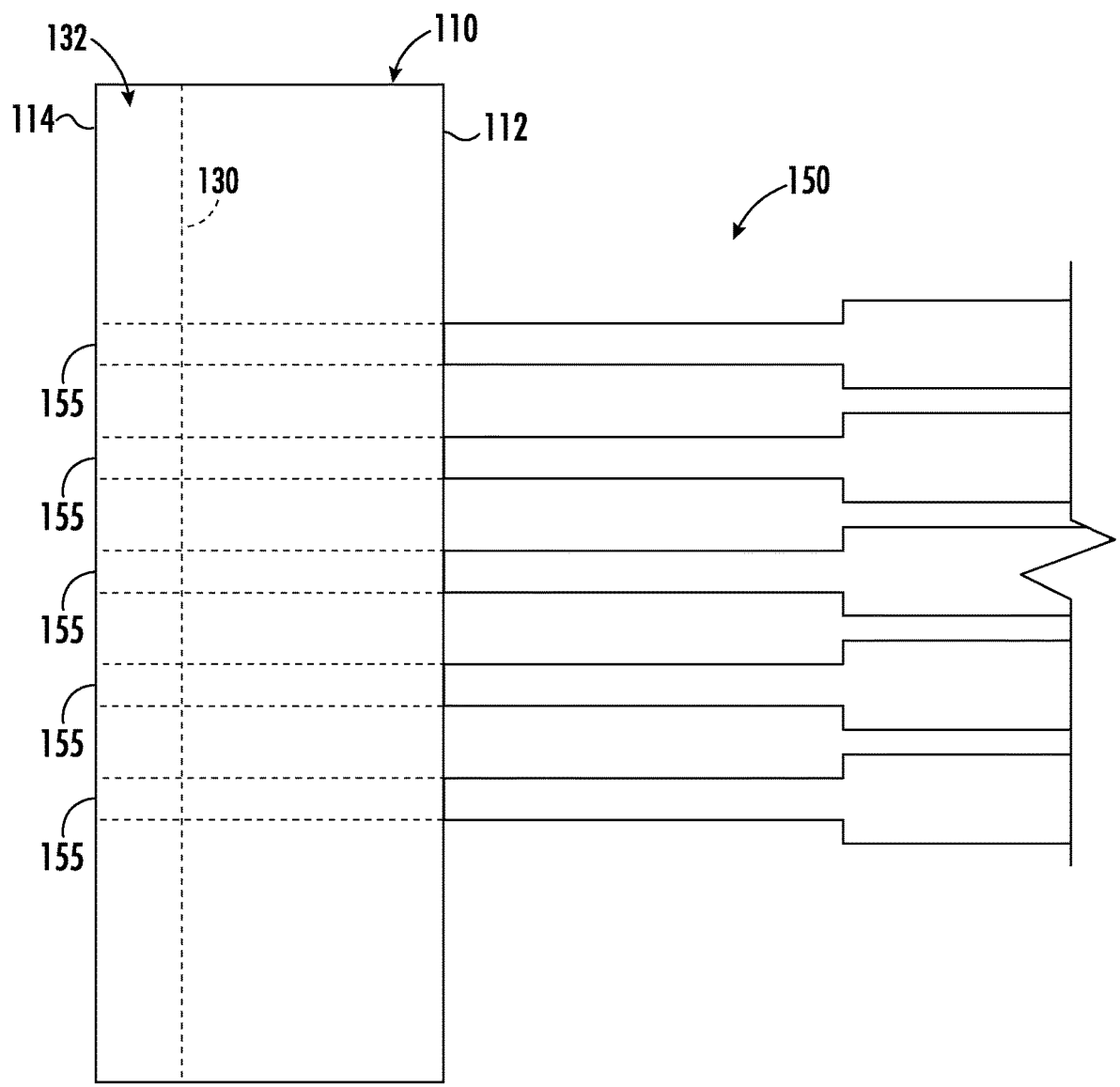
FIG. 3C schematically depicts a side view of the glass ferrule plate of FIG. 3B having a plurality of optical fibers disposed in the array of insertion holes, according to one or more embodiments shown and described herein.
Figure 3D:
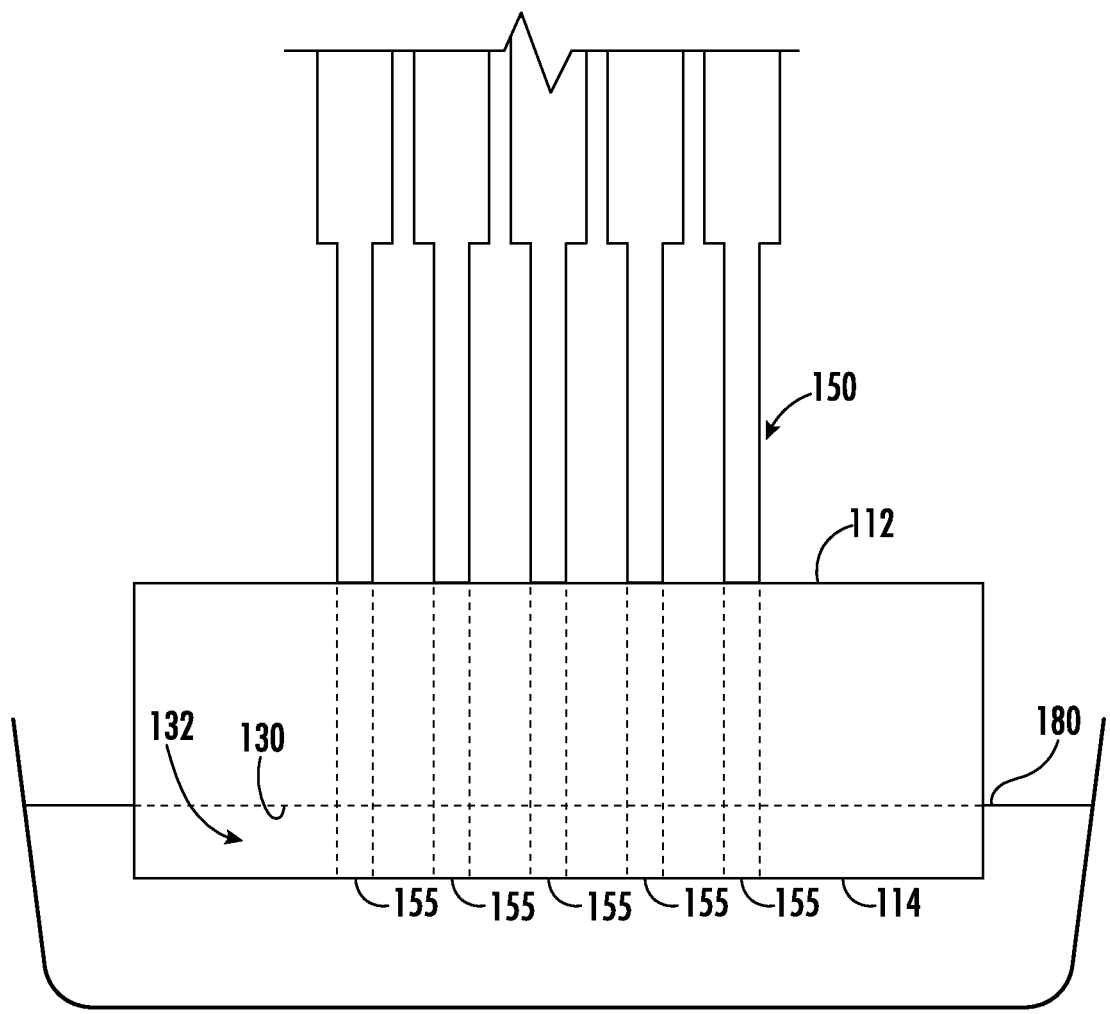
FIG. 3D schematically depicts the glass ferrule plate and the plurality of optical fibers of FIG. 3B undergoing a chemical etching processing, according to one or more embodiments shown and described herein.

Referring now to FIG. 3C, the method further comprises inserting the exposed end portion 151 of the plurality of optical fibers 150 from the first surface 112 of the glass ferrule plate 110 into the array of insertion holes 115. The exposed end portions 151 may be inserted until the end facets 155 reach the second surface 114 of the glass ferrule plate 110. In some embodiments, alignment between the end facets 155 of the plurality of optical fibers 150 and the second surface 114 of the glass ferrule plate 110 is achieved by positioning a mounting plate at the second surface 114 and inserting the exposed end portion 151 of the plurality of optical fibers 150 from the first surface 112 of the glass ferrule plate 110 into the array of insertion holes 115 until each end facet 155 contacts the mounting plate.

Next, the method comprises fixedly coupling the plurality of optical fibers 150 in the array of insertion holes 115, for example, by exposing the epoxy 160 to ultraviolet radiation to cure the epoxy 160. Once the plurality of optical fibers 150 are positioned in the array of insertion holes 115, the end facets 155 of the plurality of optical fibers 150, the second surface 114 of the glass ferrule plate 110, or both, may polished such that end facets 155 and the second surface 114 are co-planar (i.e., aligned). However, when the end facets 155 are cleaved during preparation of the exposed end portions 151, this cleaving step may achieve sufficient co-planarity such that polishing is not needed.

Next, as depicted in FIG. 3D, the method comprises chemically etching the glass ferrule plate 110 and the exposed end portion 151 of the plurality of optical fibers 150 using a chemical etchant 180 for an etching time period. In some embodiments, the chemical etchant 180 comprises hydrofluoric acid, hydrochloric acid, sulfuric acid, KOH, or the like. During the etching process, the chemical etchant 180 etches the glass ferrule plate 110 at a first etching rate and etches the exposed end portion 151 etches at a second etching rate. As noted above, the glass ferrule plate 110 and the exposed end portion 151 of the plurality of optical fibers 150 (e.g., the core 152 and the cladding 154) may comprise different materials (e.g., different glass materials) and thus the first etching rate is faster than the second etching rate. Because the first etching rate is faster than the second etching rate, the glass ferrule plate 110 etches faster than the exposed end portion 151 and, after the etching time period, the exposed end portion 151 of each of the plurality of optical fibers 150 protrude from a second surface 114 of the glass ferrule plate 110 opposite the first surface 112, as shown in FIG. 1B.

In other embodiments, the glass ferrule plate 110 and the exposed end portion 151 of the plurality of optical fibers 150 (e.g., the core 152 and the cladding 154) may comprise the same glass material or different glass materials that etch at the same etching rate. In this embodiment, the difference in the first and second etching rate is achieved by a laser exposure process. When the glass ferrule plate 110 and the exposed end portion 151 comprise materials that etch at the same etching rate, the laser damage plane 130 may be formed at the removal depth $D_R$ such that the laser damage plane etches at the first (faster) etching rate and the exposed end portion 151 etches at the second etching rate such that, after the etching time period, the exposed end portion 151 of each of the plurality of optical fibers 150 protrude from a second surface 114 of the glass ferrule plate 110.

As one example, when laser damage is formed just along the removal depth $D_R$, the chemical etchant may penetrate the glass ferrule plate 110 along the laser damage plane 130 faster (i.e., at the first etching rate) than it etches the remainder of the glass ferrule plate 110 and the exposed end portion 151, causing the glass ferrule plate 110 to separate along the laser damage plane 130 causing the exposed end portion 151 of each of the plurality of optical fibers 150 to protrude from a second surface 114 of the glass ferrule plate 110. As another example, when the laser damage is formed from the second surface 114 to the laser damage plane 130, that entire portion of the glass ferrule plate 110 etches at the first etching rate such that, after the etching time period, the exposed end portion 151 of each of the plurality of optical fibers 150 protrude from a second surface 114 of the glass ferrule plate 110. Moreover, because the plurality of optical fibers 150 are inserted to a common plane (i.e., to the second surface 114) of the glass ferrule plate 110 and because the chemical etching process uniformly removes material from the glass ferrule plate 110 away from the common plane (i.e., away from the second surface 114), the co-planarity of the end facets 155 of the plurality of optical fibers 150 is maintained.

In some embodiments, the first etching rate is from 2 to 20 times faster than the second etching rate, for example 2 to 15 times faster, 5 to 15 times faster, 3 to 10 times faster, or the like. Further, the etching time period may be from 1 minute to 30 minutes, 2 minutes to 15 minutes, or the like. The etching time period is the period of time needed to achieve the protrusion height $H_P$ of the exposed end portion 151 of the plurality of optical fibers 150 from the second surface 114. While in some embodiments, the differences between the materials of the exposed end portions 151 and the glass ferrule plate 110 cause a difference between the first etching rate and the second etching rate, other factors affect each etching rate equally and thus may be modified to modify the etching time period. Some of these factors include acid concentration in the chemical etchant 180, stirring or agitation of the chemical etchant 180 (e.g., using ultrasonics), and temperature of the chemical etchant 180. For example, the first etching rate and the second etching rate may be doubled (thus halving the etching time period) by increasing the temperature of the chemical etchant 180 from 25° C. to 50° C. In some embodiments, these etching factors may be controlled to minimize the removal of fiber material from the exposed end portion 151 while achieving the protrusion height $H_P$ of the exposed end portion 151. For example, in some embodiments, the etching step may remove 0.1 µm or less of fiber material from both the length and the diameter of the exposed end portion 151. Moreover, in other embodiments, the glass materials of the exposed end portions 151 and the glass ferrule plate 110 may be the same and instead, the presence of the laser damage plane 130 (and optionally the laser damage layer 132) may cause the difference between the first etching rate and the second etching rate.

Figure 4A:
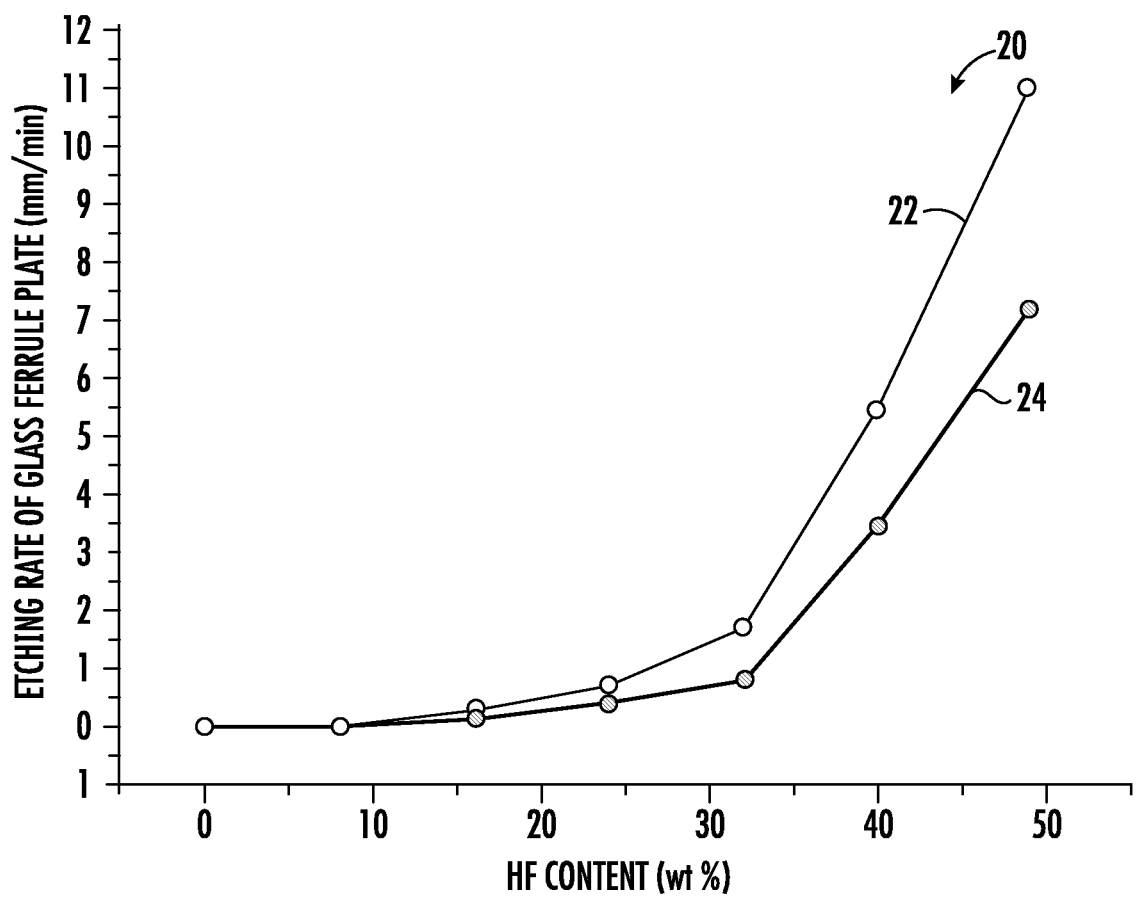
FIG. 4A graphically depicts an etching rate of a glass ferrule plate as a function of chemical etchant content, according to one or more embodiments shown and described herein.
Figure 4B:
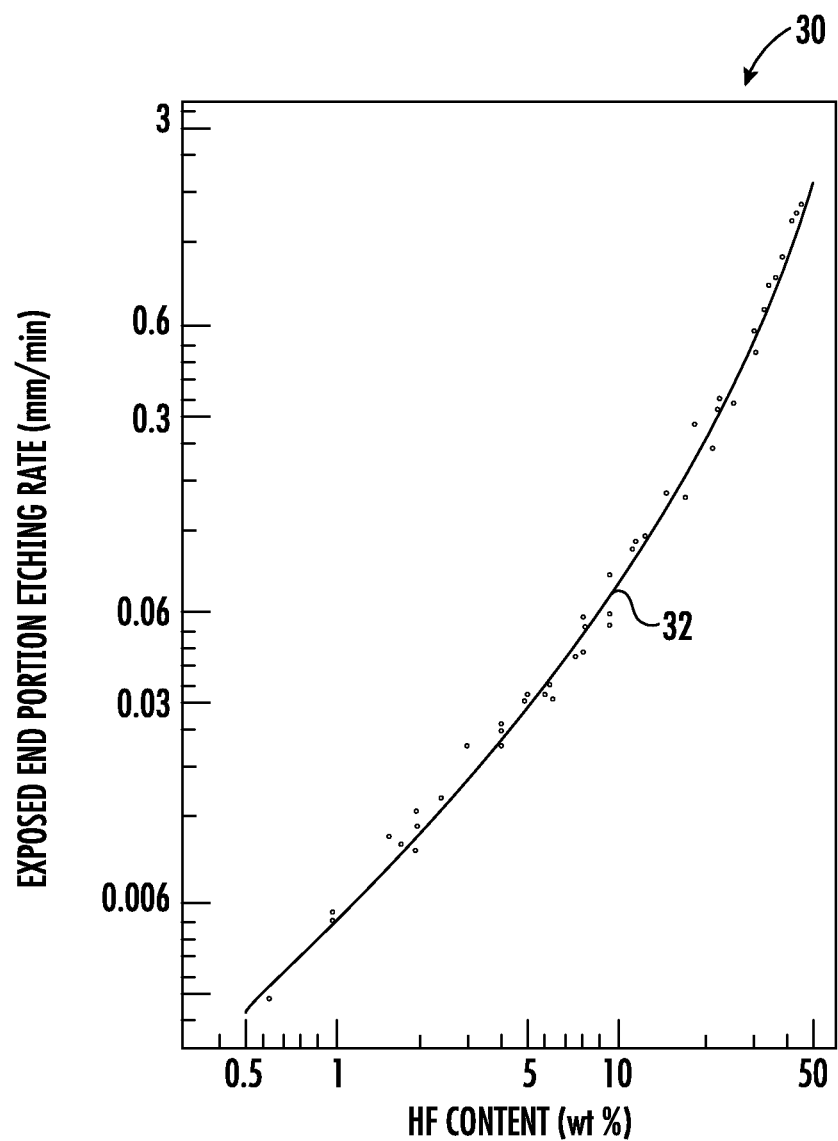
FIG. 4B graphically depicts an etching rate of an exposed end portion of an optical fiber as a function of chemical etchant content, according to one or more embodiments shown and described herein.

Referring now to FIGS. 4A and 4B, the etching rate of an example glass ferrule plate (i.e., the first etching rate) and the etching rate of the exposed end portions of an example plurality of optical fibers (i.e., the second etching rate) are each graphically depicted as a function of chemical etchant content. In particular, graph 20 of FIG. 4A depicts the etching rate (µm/min) of an example glass ferrule plate comprising Corning® Pyrex® glass when annealed (line 22) and when not annealed (line 24). Further, line 32 of graph 30 of FIG. 4B depicts the etching rate (µm/min) of the exposed end portion of an example optical fiber comprising silica.

FIGS. 4A and 4B show that the example glass ferrule plate chemically etches much faster than the exposed end portion of the example plurality of optical fibers. As shown in FIGS. 4A and 4B, the example glass ferrule plate comprising Corning® Pyrex® glass has an etch rate of 7.5 µm/min in a chemical etchant comprising 49% HF and the example exposed end portion comprising silica has an etch rate of 1.8 um/min in a chemical etchant comprising 49% HF. Thus, the example glass ferrule plate comprising Corning® Pyrex® glass has an etching rate (i.e., the first etching rate) that is 4 times faster than the etching rate of the example exposed end portion (i.e., the second etching rate). In this example, for a protrusion height $H_P$ of 1 µm, the length and diameter of each exposed end portion is only reduced by 0.25 µm.

Moreover, the glass ferrule plate embodiment graphically depicted in FIG. 4A does not include the damage plane 130 or the laser damaged layer 132. However, when the glass ferrule plate 110 includes the laser damaged layer 132, the laser damaged layer 132 etches at a third etching rate, which is faster than both the first etching rate (i.e., the etching rate of the remaining portion of the glass ferrule plate 110) and the second etching rate (i.e., the etching rate of the exposed end portion 151 of the plurality of optical fibers 150. In some embodiments, the third etching rate is at least 10 times faster than the first etching rate and can be greater than 1000 times faster than the first etching rate.

Forming the laser damaged layer 132 facilitates co-planarity between the end facets 155 of the exposed end portions 151 of the plurality of optical fibers 150 and further minimizes removal of material of the plurality of optical fibers 150 when compared to embodiments without the laser damaged layer 132. As an example, when the third etching rate is at least 10 times faster than the first etching rate (i.e., the etching rate of the undamaged portion of the glass ferrule plate 110) and the first etching rate is at least 4 times faster than the second etching rate (i.e., the etching rate of the exposed end portions 151), the third etching rate is at least 40 times faster than the first etching rate and thus the laser damaged layer 132 etches at least 40 times faster than the exposed end portions 151 of the plurality of optical fibers 150. In this example, removing 1 µm of the glass material of the glass ferrule plate 110 results in a 0.025 nm removal of the glass material of the exposed end portion 151 of the plurality of optical fibers 150 (e.g., from the length and width/diameter of the exposed end portion 151). Moreover, as noted above, when glass materials of the exposed end portions 151 and the glass ferrule plate 110 are the same, the presence of the laser damage layer 132 may facilitate the differential etching between the glass ferrule plate 110 and the exposed end portions 151.

In some embodiments, the method may further comprise polishing the end facets 155 of the plurality of optical fibers 150, after etching, to remove any surface roughness created by the etching process. Polishing may be avoided by increasing the difference between the first etching rate and the second etching rate (i.e., increasing the etch ratio between the glass ferrule plate 110 and the exposed end portions 151 of the plurality of optical fibers 150). In some embodiments, when the etch ratio is 10:1 or greater, polishing is not needed. Polishing may also be avoided by forming the laser damaged layer 132 in the glass ferrule plate 110 before chemically etching, as the difference between the third etching rate and the second etching rate is much larger than the difference between the first etching rate and the second etching rate.

Referring again to FIG. 2, after manufacturing the fiber ferrule assembly 100 (i.e., the first fiber ferrule assembly 100), the plurality of optical fibers 150 may be optically coupled to the plurality optical fibers 250 of the second fiber ferrule assembly 200. In particular, the end facets 155 of the plurality of optical fibers 150 (i.e., the first plurality of optical fibers) be placed in direct contact with the end facets 255 of the plurality of optical fibers 250 (i.e., the second plurality of optical fibers), as depicted in FIG. 2, thereby optically coupling the first plurality of optical fibers 150 and the second plurality of optical fibers 250. It should be understood that the second fiber ferrule assembly 200 may also be manufactured using the method described above with respect to FIGS. 3A-3D such that the end facets 255 of the second plurality of optical fibers 250 have a level of co-planarity similar to the end facets 155 of the first plurality of optical fibers 150.

The co-planarity of the end facets 155 and the similar co-planarity of the end facets 255 allows for direct contact optical coupling at a low mating face (i.e., the force required to place all the end facets 155 of the plurality of optical fibers 150 into direct contact with a corresponding end facet 255 of the second plurality of optical fibers 250). In some embodiments, end facets 155 of the plurality of optical fibers 150 may be placed in direct contact with the end facets 255 of the second plurality of optical fibers 250 using a mating force of 30 newtons or less, such as 25 newtons or less, 20 newtons or less, 15 newtons or less, 10 newtons or less, 5 newtons or less, or the like.

Furthermore, the array of insertion holes 115 of both the first glass ferrule plate 110 and the second glass ferrule plate 210 may have the same or substantially the same positional arrangement such that when the first and second plurality of optical fibers 150 are coupled to the arrays of insertion holes 115 of the first and second glass ferrule plates 210, the end facets 155, 255 of the first and second plurality of optical fibers 150, 250 are in axial alignment or are near axial alignment. For example, each optically coupled and physically contacting pair of end facets 155, 255 of the first and second plurality of optical fibers 150, 250 may be radially offset from one another by 500 nm or less, such as, 200 nm or less, 150 nm or less, 100 nm or less 50 nm or less, or the like. In some embodiments, each optically coupled and physically contacting pair of end facets 155, 255 may be in axial alignment such that they have no radial offset.

In view of the foregoing description, it should be understood that the method of manufacturing a fiber ferrule assembly that includes a glass ferrule plate and plurality of optical fibers described herein achieves uniform co-planarity between the end facets of a plurality of optical fibers. During the manufacturing of the fiber ferrule assembly, exposed end portions of the plurality of optical fibers may be inserted into an array of insertion holes from the first surface of the glass ferrule plate and the end facets of the plurality of optical fibers may be positioned in alignment with the second surface of the glass ferule plate. Next, the second surface of the glass ferrule plate and the exposed end portions may be chemically etched. Since the glass ferrule plate and the exposed end portions of the plurality of optical fibers comprise different glass materials, they chemically etch at different etching rates when exposed to the same etching conditions. The differential chemical etching causes the exposed end portions of each of the plurality of optical fibers to protrude uniformly from the second surface and forms end facets that are co-planar. These co-planar end facets facilitate direct contact optical coupling between with the plurality of optical fibers of the fiber ferrule assembly and the optical fibers of another, similarly manufactured fiber ferrule assembly at a low mating force, the optical connection having low insertion losses and low back-reflection.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

What is claimed is:

1. A method of manufacturing a fiber ferrule assembly, the method comprising:
laser forming a damage plane in a glass ferrule plate at a removal depth $D_R$ from a second surface of the glass ferrule plate using a laser beam;
inserting an exposed end portion of a plurality of optical fibers from a first surface of the glass ferrule plate opposite the second surface into an array of insertion holes disposed in the glass ferrule plate, wherein:

the exposed end portion of the plurality of optical fibers comprises a core and a cladding surrounding the core; and the glass ferrule plate comprises a glass material that differs from a glass material of both the core and the cladding; and chemically etching the glass ferrule plate and the exposed end portion of the plurality of optical fibers using a chemical etchant for an etching time period, wherein:
the glass ferrule plate is etched at a first etching rate;
the exposed end portion is etched at a second etching rate; and
the first etching rate is faster than the second etching rate such that, after the etching time period, the exposed end portion of each of the plurality of optical fibers protrude from the second surface.

2. The method of claim 1, further comprising, prior to chemically etching the glass ferrule plate and the exposed end portion of the plurality of optical fibers, aligning end facets of the plurality of optical fibers with the second surface of the glass ferrule plate.

3. The method of claim 1, further comprising fixedly coupling the exposed end portions of the plurality of optical fibers in the array of insertion holes.

4. The method of claim 3, wherein an epoxy is disposed in the array of insertion holes and fixedly coupling the exposed end portions of the plurality of optical fibers in the array of insertion holes comprises exposing the epoxy to ultraviolet radiation to cure the epoxy.

5. The method of claim 1, wherein the first etching rate is from 2 to 20 times faster than the second etching rate.

6. The method of claim 1, wherein the core and the cladding of the plurality of optical fibers comprise silica glass and the glass ferrule plate comprises borosilicate glass.

7. The method of claim 1, further comprising removing one or more coating layers from an end portion of the plurality of optical fibers to expose the exposed end portion of the plurality of optical fibers prior to inserting the exposed end portion into the array of insertion holes.

8. The method of claim 1, further comprising forming the array of insertion holes in the glass ferrule plate prior to inserting the exposed end portion of the plurality of optical fibers into the array of insertion holes.

9. The method of claim 8, wherein forming the array of insertion holes comprises:
focusing a laser beam onto the first surface, the second surface, or at a point in between the first and second surface of the glass ferrule plate to form a plurality of damage tracks, holes or cylinders in the glass ferrule plate; and
exposing the plurality of damage tracks, holes or cylinders to a chemical etchant, thereby removing material of the glass ferrule plate along the plurality of damage tracks to form the array of insertion holes.

10. The method of claim 1, wherein each of the array of insertion holes comprises a larger maximum cross sectional dimension at the first surface of the glass ferrule plate than at the second surface of the glass ferrule plate.

11. The method of claim 10, wherein at least one of the array of insertion holes tapers from the larger maximum cross sectional dimension at the first surface to an intermediate point within the glass ferrule plate and comprises a constant maximum cross sectional dimension from the intermediate point to the second surface.

12. The method of claim 1, wherein laser damage is formed in the glass ferrule plate from the second surface of the glass ferrule plate to the damage plane, thereby forming a laser damaged layer.

13. The method of claim 12, wherein, within the laser damaged layer, the glass ferrule plate etches at a third etching rate that is faster than both the first etching rate and the second etching rate.

14. The method of claim 13, wherein the third etching rate is at least 10 times faster than the first etching rate.

15. The method of claim 1, wherein subsequent to chemically etching the glass ferrule plate and the exposed end portion of the plurality of optical fibers, the exposed end portion of each of the plurality of optical fibers extends a protrusion height $H_P$ from the second surface of the glass ferrule plate, wherein the protrusion height $H_P$ is from 1000 nm to 3500 nm.

16. The method of claim 15, wherein:
the protrusion height $H_P$ of each exposed end portion differs by 500 nm or less; and
the protrusion height $H_P$ of each pair of adjacent exposed end portions differs by 300 nm or less.

17. A method of optically coupling a first plurality of optical fibers and a second plurality of optical fibers, the method comprising:
laser forming a damage plane in a first glass ferrule plate at a first removal depth from a second surface of the first glass ferrule plate using a laser beam;
inserting an exposed end portion of the first plurality of optical fibers from a first surface of the first glass ferrule plate into an array of insertion holes disposed in the first glass ferrule plate;
chemically etching the first glass ferrule plate and the exposed end portion of the first plurality of optical fibers using a chemical etchant for an etching time period, wherein the glass ferrule plate is etched at a faster etching rate than the exposed end portion of the first plurality of optical fibers such that, after the etching time period, the exposed end portion of each of the first plurality of optical fibers protrude from the second surface of the first glass ferrule plate opposite the first surface and terminate at an end facet of the first plurality of optical fibers;
laser forming a damage plane in a second glass ferrule plate at a second removal depth from a second surface of the second glass ferrule plate using the laser beam;
inserting an exposed end portion of the second plurality of optical fibers from a first surface of the second glass ferrule plate into an array of insertion holes disposed in the second glass ferrule plate;
chemically etching the second glass ferrule plate and the exposed end portion of the second plurality of optical fibers using a chemical etchant for an etching time period, wherein the second glass ferrule plate is etched at a faster etching rate than the exposed end portion of the second plurality of optical fibers such that, after the etching time period, the exposed end portion of each of the second plurality of optical fibers protrude from the second surface of the second glass ferrule plate opposite the first surface and terminate at an end facet of the second plurality of optical fibers; and
placing the end facets of the first and second plurality of optical fibers in direct contact thereby optically coupling the first and second plurality of optical fibers.

18. The method of claim 17, wherein:
before chemically etching the first glass ferrule plate and the exposed end portion of the first plurality of optical fibers, end facets of the first plurality of optical fibers are aligned with the second surface of the first glass ferrule plate; and before chemically etching the second glass ferrule plate and the exposed end portion of the second plurality of optical fibers, end facets of the second plurality of optical fibers are aligned with the second surface of the second glass ferrule plate.

19. The method of claim 17, wherein an epoxy is disposed in the array of insertion holes of the first glass ferrule plate and in the array of insertion holes of the second glass ferrule plate, and the method further comprises:

exposing the epoxy disposed in the array of insertion holes of the first glass ferrule plate to ultraviolet radiation to cure the epoxy to fixedly couple the first plurality of optical fibers to the first glass ferrule plate; and exposing the epoxy disposed in the array of insertion holes of the second glass ferrule plate to ultraviolet radiation to cure the epoxy to fixedly couple the second plurality of optical fibers to the second glass ferrule plate.

20. The method of claim 17, wherein the end facets are placed in direct contact with a mating force of 30 newtons or less.

21. The method of claim 17, wherein the first plurality of optical fibers and the second plurality of optical fibers each comprise single mode optical fibers.

22. The method of claim 17, wherein each optically coupled and physically contacting pair of end facets of the first and second plurality of optical fibers are radially offset from one another by 500 nm or less.

23. The method of claim 17, wherein the end facets of the first and second plurality of optical fibers protrude from the second surface of the first and second glass ferrule plate, respectively, by a protrusion height $H_P$ of from 1000 nm to 3500 nm.

24. The method of claim 23, wherein
the protrusion height $H_P$ of each exposed end portion of the first and the second plurality of optical fibers differs by 500 nm or less; and
the protrusion height $H_P$ of each pair of adjacent exposed end portion of the first and second plurality of optical fibers differ by 300 nm or less.

25. A method of manufacturing a fiber ferrule assembly, the method comprising:
inserting an exposed end portion of a plurality of optical fibers from a first surface of a glass ferrule plate into an array of insertion holes disposed in the glass ferrule plate, wherein the exposed end portion of the plurality of optical fibers comprises a core and a cladding surrounding the core;

laser forming a damage plane in the glass ferrule plate at a removal depth $D_R$ from a second surface of the glass ferrule plate opposite the first surface using a laser beam; and chemically etching the glass ferrule plate and the exposed end portion of the plurality of optical fibers using a chemical etchant for an etching time period, wherein:
the damage plane of the glass ferrule plate is etched at a first etching rate;
the exposed end portion is etched at a second etching rate; and
the first etching rate is faster than the second etching rate such that, after the etching time period, the exposed end portion of each of the plurality of optical fibers protrude from second surface.

26. The method of claim 25, wherein laser damage is formed in the glass ferrule plate from the second surface of the glass ferrule plate to the damage plane, thereby forming a laser damaged layer, wherein the laser damaged layer of the glass ferrule plate etches at the first etching rate.

27. The method of claim 25, wherein the second etching rate is at least 10 times faster than the first etching rate.

28. The method of claim 25, wherein:
subsequent to chemically etching the glass ferrule plate and the exposed end portion of the plurality of optical fibers, the exposed end portion of each of the plurality of optical fibers extend a protrusion height $H_P$ from the second surface of the glass ferrule plate, wherein the protrusion height $H_P$ is from 1000 nm to 3500 nm;
the protrusion height $H_P$ of each exposed end portion differs by 500 nm or less; and
the protrusion height $H_P$ of each pair of adjacent exposed end portions differs by 300 nm or less.

29. The method of claim 25, wherein before chemically etching the glass ferrule plate and the exposed end portion of the plurality of optical fibers, end facets of the plurality of optical fibers are aligned with the second surface of the glass ferrule plate.

30. The method of claim 25, further comprising fixedly coupling the exposed end portions of the plurality of optical fibers in the array of insertion holes, wherein an epoxy is disposed in the array of insertion holes and fixedly coupling the exposed end portions of the plurality of optical fibers in the array of insertion holes comprises exposing the epoxy to ultraviolet radiation to cure the epoxy.

31. The method of claim 25, further comprising forming the array of insertion holes in the glass ferrule plate prior to inserting the exposed end portion of the plurality of optical fibers into the array of insertion holes.

32. The method of claim 25, wherein the glass ferrule plate, the core, and the cladding each comprise the same glass material or different glass materials that etch at the same etching rate.

* * * * *

UNITED STATES PATENT AND TRADEMARK OFFICE
CERTIFICATE OF CORRECTION

Page 1 of 1

PATENT NO. : 11,104,605 B2
APPLICATION NO. : 16/697093
DATED : August 31, 2021
INVENTOR(S) : Alan Frank Evans et al.

It is certified that error appears in the above-identified patent and that said Letters Patent is hereby corrected as shown below:

In the Claims

In Column 18, Line 14, Claim 25, before "second surface" insert -- the --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*